(12) United States Patent
Record et al.

(10) Patent No.: US 9,695,723 B2
(45) Date of Patent: Jul. 4, 2017

(54) COMBUSTION SYSTEM INCLUDING A PISTON CROWN AND FUEL INJECTOR

(71) Applicant: General Electric Company, Schenectady, NY (US)

(72) Inventors: Barry Record, Grove City, PA (US); Roy James Primus, Niskayuna, NY (US); Venu Gummadavelli, Fairview, PA (US); James Henry Yager, Northville, MI (US); Omowoleola Chukwuemeka Akinyemi, Clifton Park, NY (US); Adam Edgar Klingbeil, Ballston Lake, NY (US); Thomas Michael Lavertu, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 14/155,553

(22) Filed: Jan. 15, 2014

(65) Prior Publication Data

US 2015/0198070 A1    Jul. 16, 2015

(51) Int. Cl.
*F02M 61/18*    (2006.01)
*F02B 23/06*    (2006.01)
*F01N 3/10*    (2006.01)

(52) U.S. Cl.
CPC ............ *F01N 3/10* (2013.01); *F02B 23/0669* (2013.01); *F02M 61/184* (2013.01);
(Continued)

(58) Field of Classification Search
CPC ............. F02M 61/1813; F02M 61/184; F02M 61/1846; F02M 61/1826; F02M 21/0263;
(Continued)

(56) References Cited

U.S. PATENT DOCUMENTS 4,058,090 A * 11/1977 Suzuki ................... F02B 19/12
                                                    123/193.4
4,414,940 A * 11/1983 Loyd ........................ F02B 3/00
                                                     123/275
(Continued)

FOREIGN PATENT DOCUMENTS

CN        2497067 Y     6/2002
CN        1556894 A    12/2004
(Continued)

OTHER PUBLICATIONS

German Office Action issued in connection with corresponding DE Application No. 102015100361.9 on May 6, 2016.
(Continued)

*Primary Examiner* — Grant Moubry
(74) *Attorney, Agent, or Firm* — Global Patent Operation; John A. Kramer (57) ABSTRACT

Various methods and systems are provided for a combustion system of an engine. In one example, a combustion system comprises a piston crown bowl with a central apex, a combustion chamber operable at a compression ratio in a range of from about 13:1 to about 17:1, the combustion chamber formed at least partially by the piston crown bowl, and a fuel injector with a nozzle extending into a central portion of the combustion chamber that is operable to inject fuel directly into the combustion chamber, the nozzle defining a number of apertures that is in a range of from six to ten.

5 Claims, 7 Drawing Sheets

(52) U.S. Cl.
CPC .... *F02M 61/1806* (2013.01); *F02M 61/1846* (2013.01); *F02B 23/0645* (2013.01)

(58) Field of Classification Search
CPC .............. F02M 63/0225; F02M 65/001; F02B 23/0645; F02B 23/0669; F02B 23/0672; F02B 2075/125; F02D 41/3815; F02D 2041/389
USPC ........................... 123/193.6, 197.2, 661, 305
See application file for complete search history.

(56) References Cited

U.S. PATENT DOCUMENTS

| | | | | |
|---|---|---|---|---|
| 4,883,032 | A * | 11/1989 | Hunter | F02B 3/06 123/256 |
| 5,868,112 | A * | 2/1999 | Mahakul | F02B 23/0669 123/263 |
| 6,443,374 | B1 * | 9/2002 | Astachow | F02M 61/184 239/533.2 |
| 7,143,738 | B2 * | 12/2006 | Ganz | F02B 17/00 123/295 |
| 7,168,637 | B2 * | 1/2007 | Goenka | F02M 61/1806 239/497 |
| 7,219,649 | B2 * | 5/2007 | Duffy | F02D 41/3035 123/299 |
| 7,798,430 | B2 * | 9/2010 | Kuronita | F02M 61/182 123/305 |
| 7,895,986 | B2 * | 3/2011 | Shimo | F02M 45/086 123/298 |
| 8,215,572 | B2 * | 7/2012 | Vogel | F02B 23/0669 123/299 |
| 8,424,506 | B2 * | 4/2013 | Hasegawa | F02B 23/0651 123/193.6 |
| 8,464,686 | B2 * | 6/2013 | Kim | F02B 23/0651 123/279 |
| 8,672,239 | B2 * | 3/2014 | Ogura | F02M 51/0685 239/533.12 |
| 8,776,760 | B2 * | 7/2014 | Stovell | F02B 23/0651 123/298 |
| 8,869,770 | B2 * | 10/2014 | Bazyn | F02B 23/0651 123/275 |
| 2002/0043574 | A1 | 4/2002 | Hunkert | |
| 2002/0179039 | A1 * | 12/2002 | Wuerfel | F02M 61/1826 123/298 |
| 2003/0183196 | A1 | 10/2003 | Gatellier et al. | |
| 2004/0178287 | A1 | 9/2004 | Okamoto et al. | |
| 2006/0081212 | A1 * | 4/2006 | Hill | F02B 23/0651 123/298 |
| 2008/0135014 | A1 | 6/2008 | Blessing et al. | |
| 2008/0196691 | A1 * | 8/2008 | Kihara | F02B 23/104 123/299 |
| 2009/0025681 | A1 * | 1/2009 | Takahashi | F02B 23/0669 123/305 |
| 2011/0030635 | A1 * | 2/2011 | Siuchta | F02M 57/025 123/1 A |
| 2012/0085316 | A1 * | 4/2012 | Chen | F02M 61/1826 123/298 |
| 2012/0160205 | A1 | 6/2012 | Gladden et al. | |
| 2012/0292409 | A1 * | 11/2012 | Bignion | F02M 61/1833 239/533.2 |

FOREIGN PATENT DOCUMENTS

| | | |
|---|---|---|
| DE | 19649052 A1 | 5/1998 |
| DE | 19925380 A1 | 12/2000 |
| DE | 102004005526 A1 | 8/2004 |
| EP | 0849448 A1 | 6/1998 |
| EP | 1561924 A2 | 8/2005 |
| EP | 1639251 B1 | 10/2007 |
| EP | 1348847 B1 | 6/2010 |
| WO | 03010423 A1 | 2/2003 |

OTHER PUBLICATIONS

Unofficial English Translation of Chinese Office Action issued in connection with corresponding CN Application No. 201510020506.3 on Nov. 2, 2016.

\* cited by examiner

COMBUSTION SYSTEM INCLUDING A PISTON CROWN AND FUEL INJECTOR

FIELD

Embodiments of the subject matter disclosed herein relate to an engine, engine components, and an engine system, for example.

BACKGROUND

Engines may utilize an exhaust aftertreatment system to reduce regulated emissions. However, aftertreatment systems may add to maintenance and overall costs of the engine system. Further, as emissions requirements become more stringent, engines may be required to further reduce NOx and particulate matter emissions. Characteristics of a combustion system of the engine, such as a compression ratio and fuel injection parameters, may also affect NOx and particulate matter emissions levels.

BRIEF DESCRIPTION

In one embodiment, a combustion system (e.g., for an engine) comprises a piston crown bowl with a central apex, and a combustion chamber operable at a compression ratio in a range of from about 13:1 to about 17:1. The combustion chamber is formed at least partially by the piston crown bowl. The system further comprises a fuel injector with a nozzle extending into a central portion of the combustion chamber that is operable to inject fuel directly into the combustion chamber. The nozzle has a number of apertures that is in a range of from six to ten.

In one example, decreasing a compression ratio of the engine may reduce engine emissions. Additionally, providing particular fuel injection parameters (as described herein) may further reduce emissions while maintaining engine performance. Thus, a combustion system operable at a compression ratio from about 13:1 to about 17:1 and including a fuel injector with six to ten apertures configured for reduced emissions (relative to other fuel injectors with different configurations) may result in an engine with reduced NOx and particulate matter emissions over engines with higher compression ratios. In addition to meeting industry defined emissions requirements, reducing particulate matter and NOx emissions may allow for the reduction in size or elimination of an aftertreatment system of the engine. Reducing the size of the aftertreatment system may reduce fuel consumption of the engine while also reducing overall and maintenance costs of the engine.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
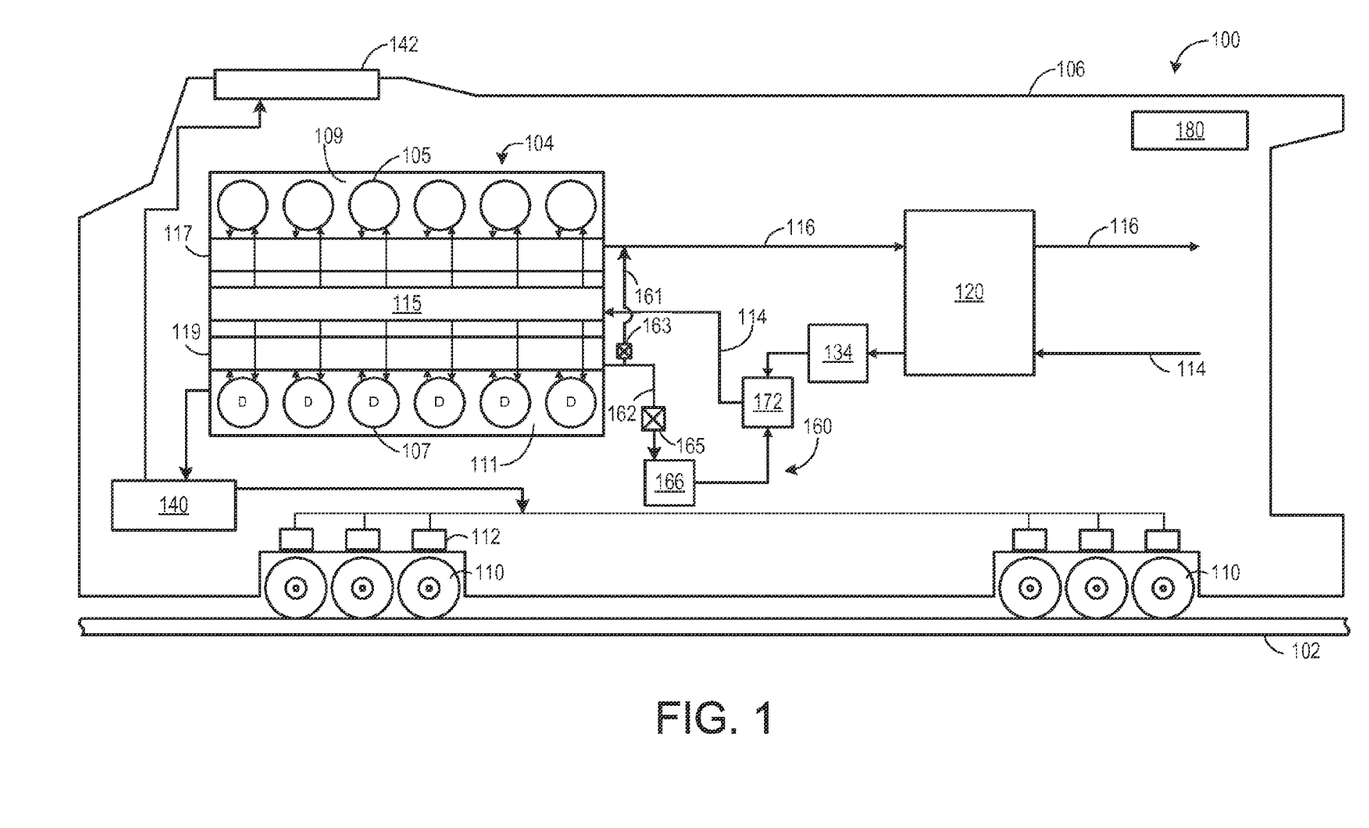
FIG. 1 shows a schematic diagram of a rail vehicle with an engine according to an embodiment of the invention.
Figure 2:
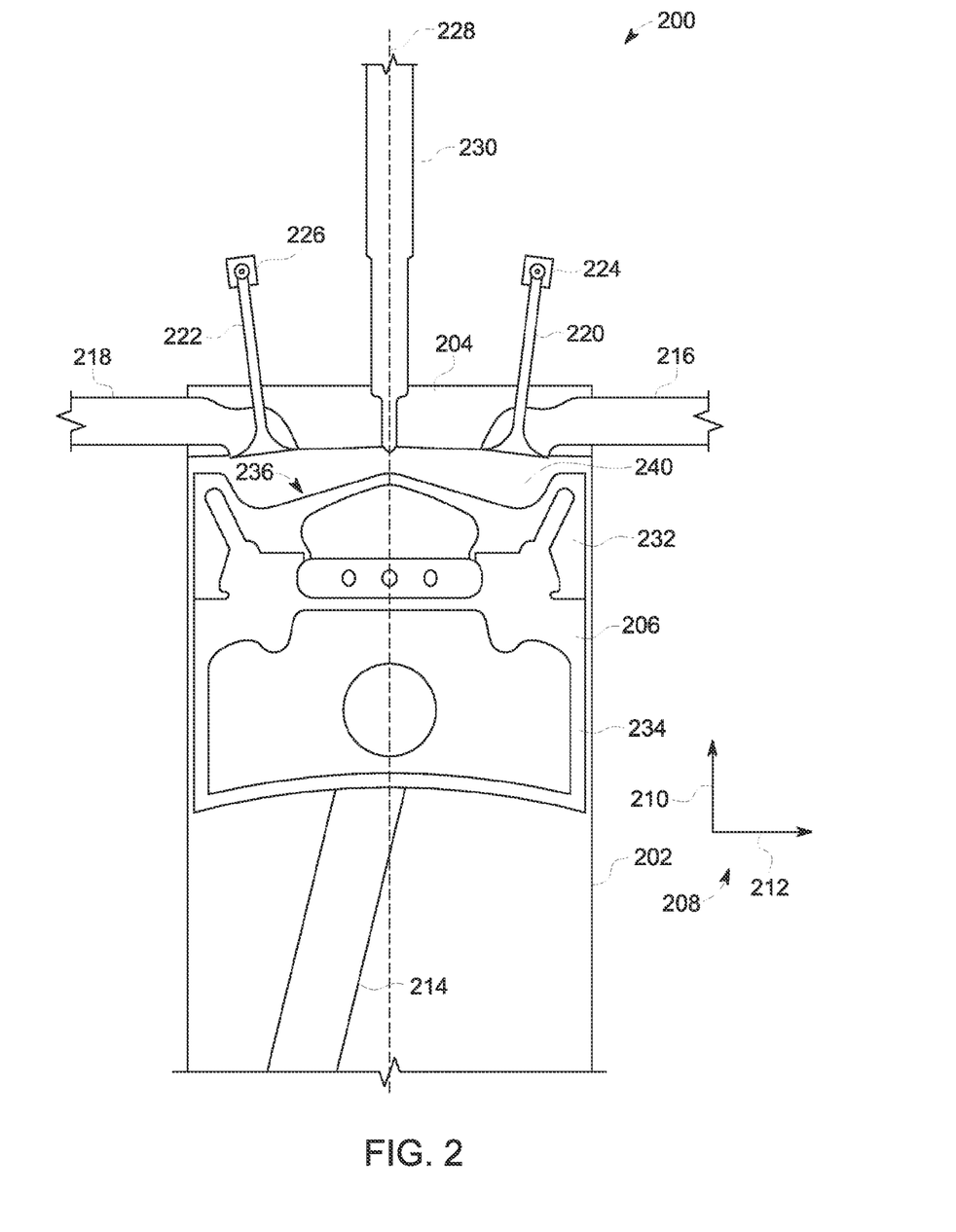
FIG. 2 shows a schematic of combustion system of an engine according to an embodiment of the invention.
Figure 3:
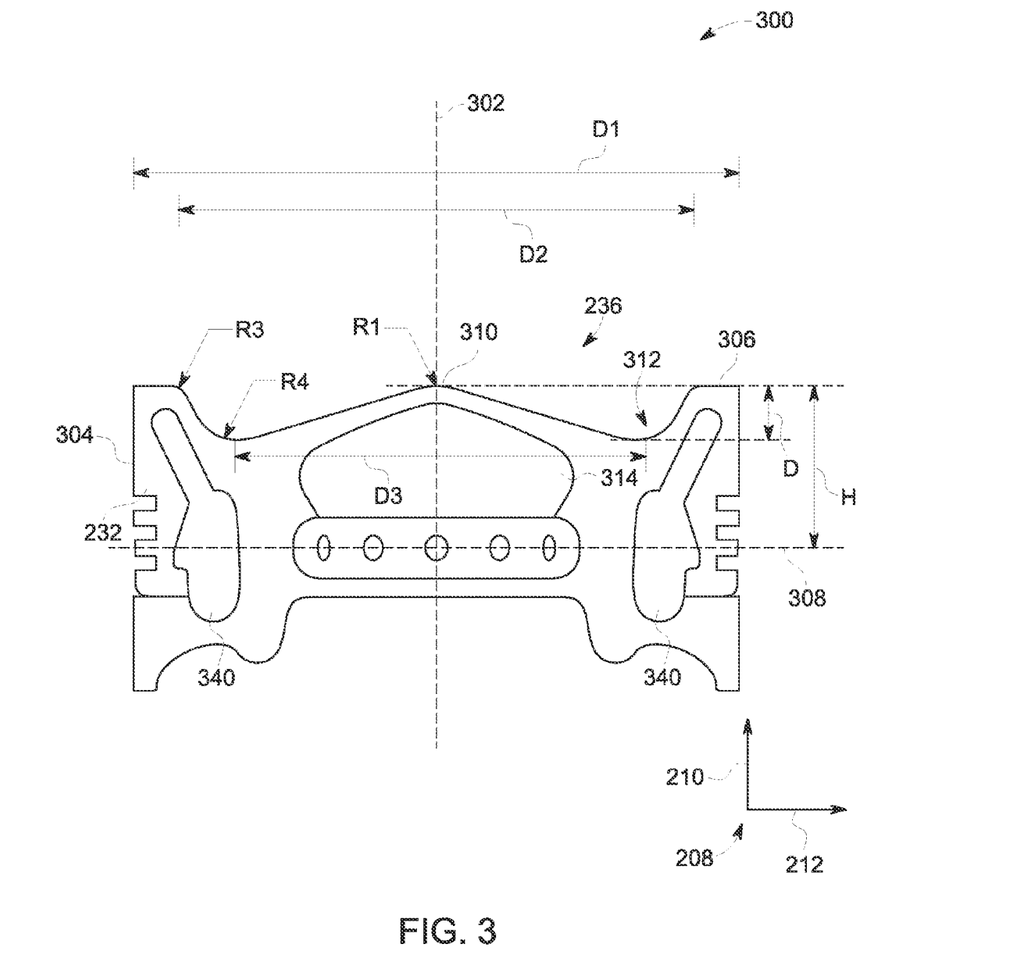
FIG. 3 shows a schematic of a piston crown according to an embodiment of the invention.

The following description relates to various embodiments of a combustion system for an engine system, such as the engine system shown in FIG. 1. The combustion system, as shown in FIG. 2, may include a piston crown bowl, a combustion chamber, and a fuel injector. The piston crown bowl may have a geometry forming, at least partially, the combustion chamber. The combustion chamber may be operable at a compression ratio in a range of from about 13:1 to about 17:1. As the compression ratio decreases, NOx and particulate matter emissions may also decrease. As shown in FIG. 3, the piston crown bowl may be sized to provide the desired compression ratio. A geometry of a nozzle of the fuel injector may also affect NOx and particulate matter emissions. Specifically, a number of apertures of the nozzle, along with a geometry of the nozzle apertures, may determine a nozzle flow rate and spray angle which affect NOx and particulate matter emissions from the engine. Thus, the geometry of the nozzle, as depicted at FIGS. 4-7, may be defined in accordance with the piston bowl and geometry to further reduce NOx and particulate matter emissions while also maintaining engine performance. As a result, emission levels of the engine may be reduced to meet regulated emissions levels with either reduced or no aftertreatment of the exhaust gases.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the combustion system for reduced engine emissions, an example of a platform is disclosed in which the engine system may be installed in a vehicle, such as a rail vehicle. For example, FIG. 1 shows a block diagram of an embodiment of a vehicle system 100, herein depicted as a rail vehicle 106 (e.g., locomotive), configured to run on a rail 102 via a plurality of wheels 110. As depicted, the rail vehicle 106 includes an engine 104. In other non-limiting embodiments, the engine 104 may be a stationary engine, such as in a power-plant application, or an engine in a marine vessel or other off-highway vehicle propulsion system as noted above.

The engine 104 receives intake air for combustion from an intake, such as an intake manifold 115. The intake may be any suitable conduit or conduits through which gases flow to enter the engine. For example, the intake may include the intake manifold 115, the intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust. The exhaust may be any suitable conduit through which gases flow from the engine. For example, the exhaust may include an exhaust manifold 117, an exhaust passage 116, and the like. Exhaust gas flows through the exhaust passage 116 and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 140 and electric traction motors 112. For example, the engine 104 is a diesel engine that generates a torque output that is transmitted to the alternator/generator 140 which is mechanically coupled to the engine 104. The alternator/generator 140 produces electrical power that may be stored and applied for subsequent propagation to a variety of downstream electrical components. As an example, the alternator/generator 140 may be electrically coupled to a plurality of traction motors 112 and the alternator/generator 140 may provide electrical power to the plurality of traction motors 112. As depicted, the plurality of traction motors 112 are each connected to one of a plurality of wheels 110 to provide tractive power to propel the rail vehicle 106. One example configuration includes one traction motor per wheel. As depicted herein, six pairs of traction motors correspond to each of six pairs of wheels of the rail vehicle. In another example, alternator/generator 140 may be coupled to one or more resistive grids 142. The resistive grids 142 may be configured to dissipate excess engine torque via heat produced by the grids from electricity generated by alternator/generator 140 when that electrical power is not required by traction motors.

In the embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes NOx emissions reduction mechanism of using exhaust gas recirculation (EGR). EGR is achieved by using donor and non-donor cylinders. A subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. The non-donor cylinders 105 are part of a first cylinder bank 109 and the donor cylinder 107 are part of a second cylinder bank 111 of the engine 104. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically equal to or lower than the number of non-donor cylinders. It should be clear for one skilled in the art that EGR can also be achieved by alternate methods such as usage of high pressure/low pressure pump or back pressure system or other such means.

As depicted in FIG. 1, the non-donor cylinders 105 are coupled to the exhaust passage 116 to route exhaust gas from the engine to atmosphere (after it passes through turbocharger 120). Specifically, the non-donor cylinders 105 are coupled to the exhaust passage 116 to route exhaust gas from the engine to a turbocharger 120. The donor cylinders 107, which provide engine exhaust gas recirculation (EGR), are coupled exclusively to an EGR passage 162 of an EGR system 160 which routes exhaust gas from the donor cylinders 107 to an EGR cooler 166. Exhaust gases then flow from the EGR cooler 166 to the intake passage 114 of the engine 104, and not to atmosphere. By introducing cooled exhaust gas to the engine 104, the amount of available oxygen for combustion is decreased, thereby reducing combustion flame temperatures and reducing the formation of nitrogen oxides (e.g., $NO_x$).

Exhaust gas flowing from the donor cylinders 107 to the intake passage 114 passes through a heat exchanger such as the EGR cooler 166 to reduce a temperature of (e.g., cool) the exhaust gas before the exhaust gas returns to the intake passage. The EGR cooler 166 may be an air-to-liquid heat exchanger, for example. In such an example, one or more charge air coolers, such as charge air cooler 134, disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage 116 rather than the intake passage 114.

Additionally, the EGR system 160 includes an EGR bypass passage 161 that is configured to divert exhaust from the donor cylinders back to the exhaust passage 116. The EGR bypass passage 161 may be controlled via an EGR bypass passage valve 163. The EGR bypass valve 163 may be configured with a plurality of restriction points such that a variable amount of exhaust is routed to the exhaust, in order to provide a variable amount of EGR to the intake.

The EGR system also includes an EGR valve 165 control the EGR flow through the EGR passage 162. Thus, the EGR system 160 may selectively route exhaust to the intake through the EGR valve 165 or to the exhaust passage through the EGR bypass valve 163. For example, when the EGR valve 165 is open, exhaust may be routed from the donor cylinders to the EGR cooler 166 and/or additional elements prior to being routed to the intake passage 114. Likewise, when the EGR bypass valve 163 is open, exhaust may be routed from the donor cylinders to the exhaust passage 116. A combination of both valve positions will regulate EGR flow rate through the EGR cooler and by pass valve.

The EGR valve 165 and the EGR bypass valve 163 may be on/off valves controlled by the control unit 180 (for turning the flow of EGR on or off), or they may control a variable amount of EGR, for example. As such, the valves may be adjusted into a plurality of positions between fully open and fully closed. In some examples, the EGR bypass valve 163 may be actuated such that an EGR amount is reduced (exhaust gas flows through the EGR bypass passage 161 to the exhaust passage 116). For example, the opening of the EGR bypass valve 163 may be increased, thereby increasing the flow of exhaust from the donor cylinders to the exhaust passage 116. In other examples, the EGR bypass valve 163 may be actuated such that the EGR amount is increased (e.g., exhaust gas flows from the donor cylinder exhaust manifold 119 to the EGR passage 162). For example, the opening of the EGR bypass valve 163 may be decreased, thereby reducing flow to the exhaust passage 116.

In such a configuration, the EGR bypass valve 163 is operable to route exhaust from the donor cylinders to the exhaust passage 116 of the engine 104 and the EGR valve 165 is operable to route exhaust from the donor cylinders to the intake passage 114 of the engine 104. In the embodiment shown in FIG. 1, the EGR bypass valve 163 and the EGR valve 165 may be engine oil, or hydraulically, actuated valves, for example, with a shuttle valve (not shown) to modulate the engine oil. In some examples, the valves may be actuated such that one of the EGR bypass valve 163 and the EGR valve 165 is normally open and the other is normally closed. In other examples, the EGR bypass valve 163 and the EGR valve 165 may be pneumatic valves, electric valves, or another suitable valve.

As shown in FIG. 1, the vehicle system 100 further includes an EGR mixer 172 which mixes the recirculated exhaust gas with charge air such that the exhaust gas may be evenly distributed within the charge air and exhaust gas mixture. In the embodiment depicted in FIG. 1, the EGR system 160 is a high-pressure EGR system which routes exhaust gas from a location upstream of the turbocharger 120 in the exhaust passage 116 to a location downstream of the turbocharger 120 in the intake passage 114. In other embodiments, the vehicle system 100 may additionally or alternatively include a low-pressure EGR system which routes exhaust gas from downstream of the turbocharger 120 the exhaust passage 116 to a location upstream of the turbocharger 120 in the intake passage 114.

As depicted in FIG. 1, the vehicle system 100 includes a turbocharger 120 that is arranged between the intake passage 114 and the exhaust passage 116. The turbocharger 120 increases air pressure of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages.

In some embodiments, the vehicle system 100 may further include an aftertreatment system coupled in the exhaust passage 116 upstream and/or downstream of the turbocharger 120. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or systems. In the embodiment shown in FIG. 1, the vehicle system 100 does not include an aftertreatment system. Specifically, the entire exhaust passage 116 between the engine 104 and an end of the exhaust passage 116 at ambient air does not include an aftertreatment system. As such, the exhaust passage 116 of the vehicle system 100 does not include any exhaust catalysts, emission control devices, or particulate filters. As discussed further below, the combustion system of the vehicle system may be designed such that NOx and particulate matter emissions are low enough without needing an aftertreament system to further reduce NOx and particulate matter. In some embodiments, the vehicle system 100 may include a smaller aftertreatment system with fewer components than larger, more traditional aftertreatment systems.

The vehicle system 100 further includes a control unit 180, which is provided and configured to control various components related to the vehicle system 100. Herein, the control unit 180 may also be referred to as the controller. In one example, the control unit 180 includes a computer control system. The control unit 180 further includes non-transitory, computer readable storage media (not shown) including code for enabling on-board monitoring and control of engine operation. The control unit 180, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system 100. For example, the control unit 180 may receive signals from various engine sensors such as engine speed, engine load, boost pressure, ambient pressure, exhaust temperature, exhaust pressure, turbine speed, or the like. Correspondingly, the control unit 180 may control the vehicle system 100 by sending commands to various components such as traction motors, alternator, cylinder valves, throttle, heat exchangers, wastegates or other valves or flow control elements, or the like.

Figure 4:
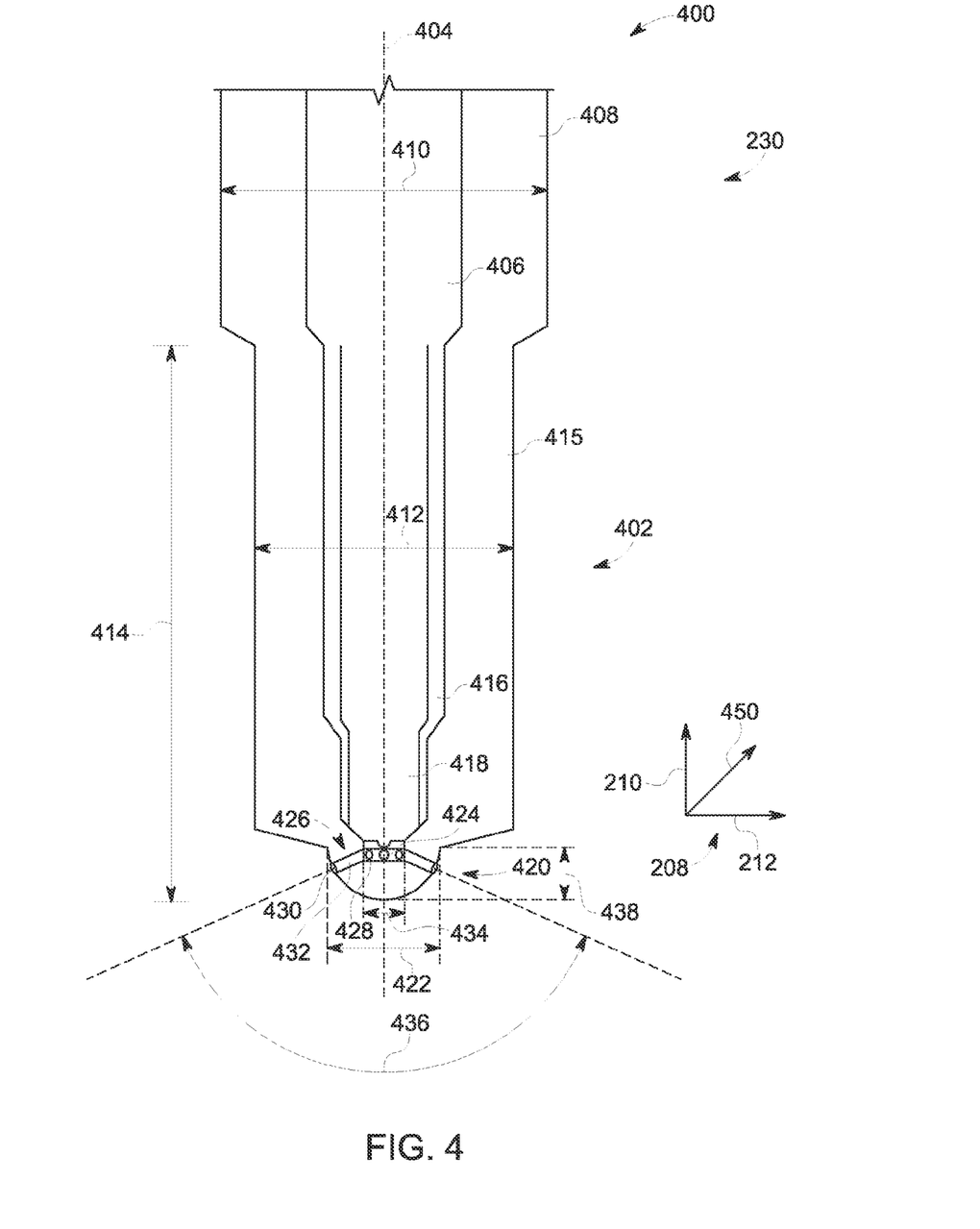
FIG. 4 shows a schematic of a fuel injector according to an embodiment of the invention.
Figure 5:
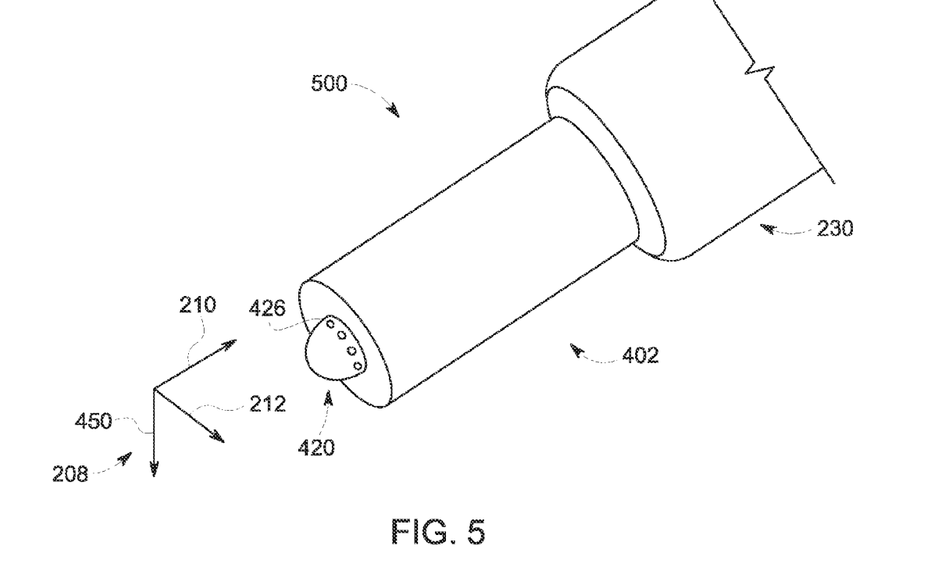
FIG. 5 shows an isometric view of a nozzle of a fuel injector according to an embodiment of the invention.
Figure 6:
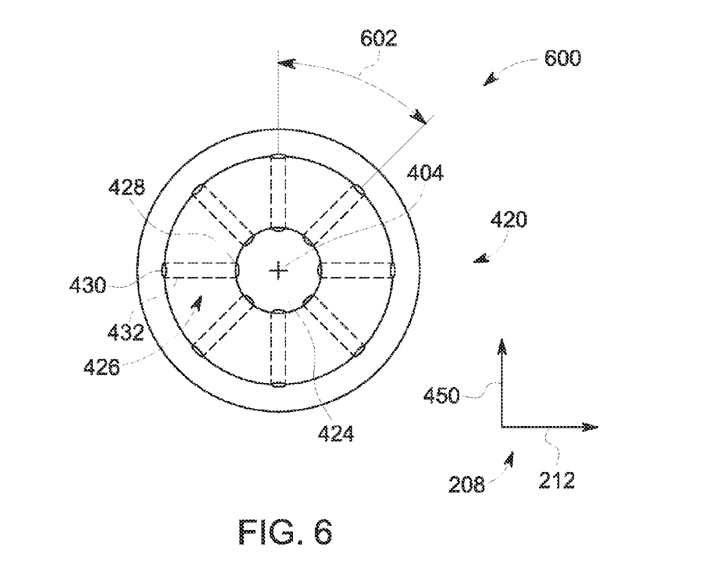
FIG. 6 shows an end view of a nozzle of a fuel injector according to an embodiment of the invention.

Turning now to FIG. 2, a combustion system 200 of an engine, such as the engine 104 shown in FIG. 1, is depicted. The combustion system 200 includes a fuel injector 230, a piston 206, and a cylinder 202. FIG. 3 shows a portion of the piston 206 in greater detail. FIGS. 4-6 show further details and views of the fuel injector 230. FIGS. 2-6 are drawn approximately to scale.

As described above with regard to FIG. 1, the engine 104 may include a plurality of cylinders, such as the non-donor cylinders 105 and/or the donor cylinders 107. The combustion system 200 may then include a plurality of cylinders and corresponding combustion components. A single cylinder 202 of the combustion system 200 is shown in FIG. 2.

The cylinder 202 has a central axis 228. The cylinder 202 may be defined by a cylinder block of the engine, e.g., the cylinder block may comprise a metal body having one or more cylindrical apertures formed therein (the cylinders of the engine) for receiving pistons. A piston 206 is positioned within the cylinder 202 and is also centered along the central axis 228. The piston 206 has a cylindrical shape. Outer walls of the piston 206 may contact and slide against interior walls of the cylinder 202. A coordinate axis 208 is shown including a vertical axis 210 and a horizontal axis 212. The piston 206 may move vertically within the cylinder 202, with respect to the vertical axis 210. Further, the piston 206 may be coupled to a crankshaft 214 so that reciprocating motion of the piston 206 is translated into rotational motion of the crankshaft 214. In some embodiments, the engine is a four-stroke engine in which each of the cylinders fires once in a firing order during two revolutions of the crankshaft 214. In other embodiments, the engine is a two-stroke engine in which each of the cylinders fires once in a firing order during one revolution of the crankshaft 214.

The cylinder 202 includes a cylinder head 204. The cylinder 202 receives intake air from an intake passage structure 216 and exhausts combustion gases to an exhaust passage structure 218. The intake passage structure 216 may be coupled to an intake manifold of the engine, such as the intake manifold 115 shown in FIG. 1, and the exhaust passage structure 218 may be coupled to an exhaust manifold of the engine, such as one of the non-donor cylinder exhaust manifold 117 or the donor cylinder exhaust manifold 119 shown in FIG. 1. The intake passage structure 216 and the exhaust passage structure 218 selectively communicate with the cylinder 202 by an intake valve 220 and an exhaust valve 222. In some embodiments, the cylinder 202 includes two or more intake valves and/or two or more exhaust valves. As shown in FIG. 2, the intake valve 220 and the exhaust valve 222 are positioned within the cylinder head 204 and at a top, with respect to the vertical axis 210, of the cylinder 202.

In the example shown in FIG. 2, the intake valve 220 and exhaust valve 222 are controlled by cam actuation systems 224 and 226, respectively. Cam actuation systems 224 and 226 each include one or more camshafts and utilize one or more of cam profile switching (CPS), variable cam timing (VCT), variable valve timing (VVT) and/or variable valve lift (VVL) systems that is operated by a controller, such as controller 180 shown in FIG. 1, to adjust valve operation.

A fuel injector 230 is shown coupled directly to the cylinder 202 for injecting fuel directly therein. Specifically, the fuel injector 230 is shown with a nozzle extending into a central portion of a combustion chamber 240 of the cylinder 202. In this manner, the fuel injector 230 provides what is known as direct injection of a fuel into the cylinder 202. In one example, the fuel is diesel fuel that is combusted in the engine through compression ignition. In other non-limiting embodiments, the fuel is natural gas, and/or gasoline, kerosene, biodiesel, or other petroleum distillates of similar density, that are combusted in the engine through compression ignition (and/or spark ignition). Further, the fuel injector 230 is positioned in the cylinder head 204 of the cylinder 202. As shown in FIG. 2, the fuel injector 230 is a central fuel injector positioned axially, with respect to the vertical axis 210, and centered along the central axis 228. Further details of the fuel injector 230 are discussed below with reference to FIGS. 4-6.

Figure 7:
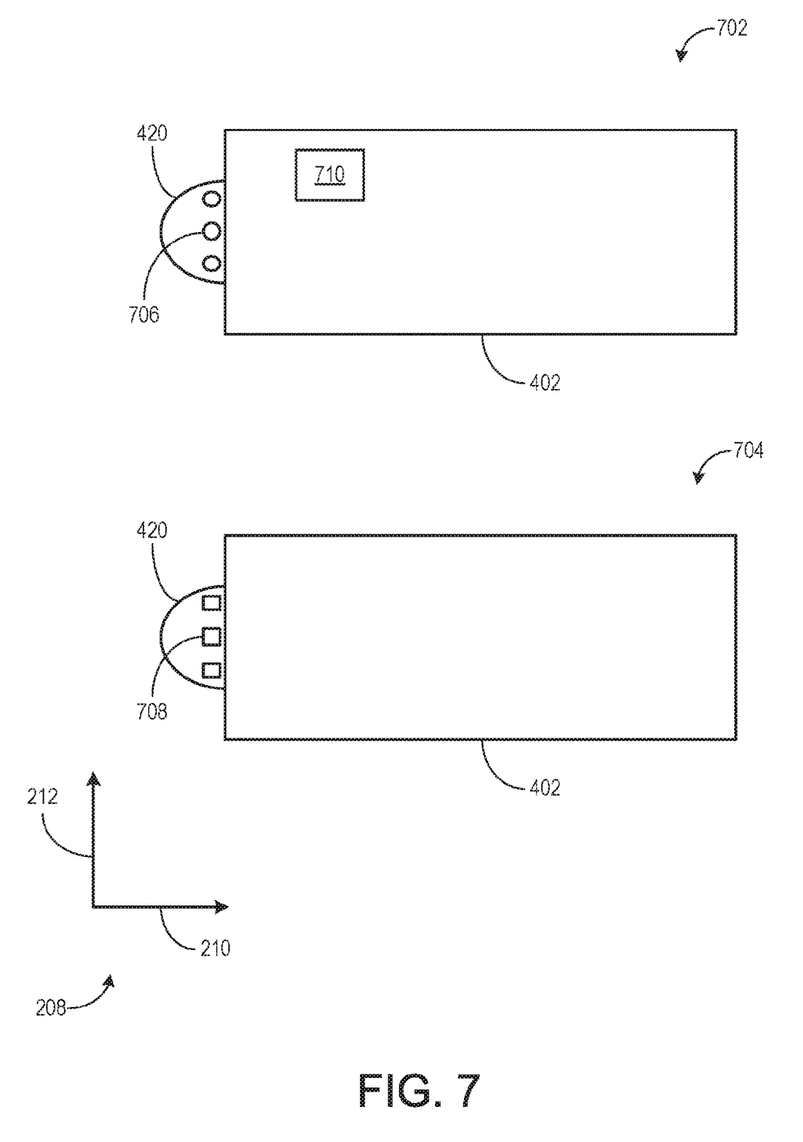
FIG. 7 shows a cross-sectional view of a nozzle of a fuel injector according to an embodiment of the invention.

The fuel injector 230 is part of a common rail fuel delivery system which delivers pressurized fuel to cylinders of the engine. A common fuel rail of the common rail fuel delivery system delivers fuel to the fuel injector 230 of the combustion system 200. The fuel injector 230 includes seals 710 (as shown in FIG. 7) that are configured to not leak fuel that is supplied through the common rail fuel delivering system that is at a pressure of 220,000 kPa or less. In other embodiments, the seals 710 may be configured to not leak fuel that is supplied through the common rail fuel delivering system that is at or below a pressure above 220,000 kPa, depending on the operating pressure of the common rail fuel delivering system in question. The seals 710 may include sealing surfaces both integral to the fuel injector 230 and connecting to the fuel injector 230.

As discussed above, the piston 206 is positioned within the cylinder 202. The piston includes a piston crown 232 and a piston skirt 234. In some embodiments, the piston crown 232 and the piston skirt 234 are formed as one piece. In other embodiments, the piston crown 232 and the piston skirt 234 are separate pieces which are coupled (e.g., mechanically coupled) together. The piston assembly 234 is coupled to the crankshaft 214. The piston crown 232 is positioned above the piston skirt 234, with respect to the vertical axis 210. As such, the piston crown 232 is positioned proximate to a top of the cylinder 202 and the piston skirt 234 is positioned proximate to a bottom of the cylinder 202. The top of the cylinder 202 may be a first end of the cylinder closest to the cylinder head 204, fuel injector 230, intake valve 224, and the exhaust valve 226. The bottom of the cylinder 202 may be a second end of the cylinder closest to the crankshaft 214.

The piston crown 232 includes a piston bowl 236. The combustion chamber 240 is formed by the piston bowl 236, sides of the cylinder 202, and the top of the cylinder 202. Further details on the shape of the piston bowl are discussed below with reference to FIG. 3. If the engine is a four-stroke engine, during engine operation, each cylinder within the engine undergoes a four stroke cycle: the cycle includes the intake stroke, compression stroke, expansion stroke, and exhaust stroke. During the intake stroke, generally, the exhaust valve 222 closes and the intake valve 220 opens. Air is introduced into the combustion chamber 240 via the intake passage structure 216, and the piston 206 moves to the bottom of the cylinder 202 so as to increase the volume within the combustion chamber 240. The position at which the piston 206 is near (e.g., proximate to) the bottom of the cylinder 202 and at the end of its stroke (e.g. when the combustion chamber 240 is at its largest volume) is typically referred to by those of skill in the art as bottom dead center (BDC). During the compression stroke, the intake valve 220 and the exhaust valve 222 are closed. The piston 206 moves toward the cylinder head 204 so as to compress the air within the combustion chamber 240. The point at which the piston 206 is at the end of its stroke and closest to the cylinder head 204 (e.g. when the combustion chamber 240 is at its smallest volume) is typically referred to by those of skill in the art as top dead center (TDC). In a process hereinafter referred to as injection, fuel is introduced into the combustion chamber 240 via the fuel injector 230. Said another way, the fuel injector 230 injects fuel directly into the combustion chamber 240. During the expansion stroke, the expanding gases push the piston 206 back to BDC. The crankshaft 214 converts the piston movement into a rotational torque of the rotary shaft. Finally, during the exhaust stroke, the exhaust valve 222 opens to release the combusted air-fuel mixture to the exhaust passage structure 218 and the piston 206 returns to TDC. Note that the above is described merely as an example, and that intake and exhaust valve opening and/or closing timings may vary, such as to provide positive or negative valve overlap, late intake valve closing, or various other examples.

A compression ratio of the cylinder 202 may be defined as the ratio between the volume of the combustion chamber 240 when the piston 206 is at the bottom of its stroke (e.g., at BDC) and the volume of the combustion chamber 240 when the piston 206 is at the top of its stroke (e.g., at TDC). Thus, the volume of the combustion chamber, and subsequently the compression ratio of the cylinder 202, is based at least partially on a geometry (e.g., shape) of the piston bowl. The shape of the piston bowl forms the volume of the piston bowl and subsequently influences the volume of the combustion chamber 240. The piston bowl geometry may be defined, along with a shape of the cylinder 202, to give a specific compression ratio.

A first engine with a first, lower compression ratio may have lower emissions (e.g., particulate matter and NOx emissions) than a second engine with a second, larger compression ratio. Specifically, a combustion chamber of the first engine may be operable at a compression ratio in a range from about 13:1 to about 17:1. A combustion chamber of the second engine may be operable at a compression ratio in a range higher than 13:1 to 17:1 (e.g., such as a range from about 18:1 to 22:1). As a result, the first engine may have a lower rate of particle matter creation and a lower rate of NOx formation.

Thus, designing a combustion system with a smaller compression ratio may reduce emissions of the engine. However, at the same time a higher compression ratio may increase engine efficiency. The piston bowl 236 shown in FIG. 2 is shaped to provide a compression ratio in a range from about 13:1 to about 17:1. As discussed above, this compression ratio range may be a smaller compression ratio range which reduces engine emissions to levels that meet standard or regulated levels while still maintaining a relatively high engine efficiency (e.g., over engines with lower compression ratios).

In one example, the combustion system shown in FIG. 2 has a compression ratio of approximately 15:1. In this example, the piston bowl design providing a compression ratio of 15:1 may result in an engine with reduced emissions levels over another engine with a compression ratio higher than 15:1. More specifically, a compression ratio of approximately 15:1 may enable low emissions while still maintaining high efficiency. For example, the compression ratio of 15:1 may be high enough so that the thermodynamic efficiency of the combustion system is high. However, the compression ratio may still be low enough to allow high levels of air and EGR to be supplied to the engine without violating peak cylinder pressure constraints. A compression ratio of 15:1 may balance these requirements, allowing high levels of EGR for NOx control, high levels of air flow for particulate matter control, and high engine efficiency via the compression ratio.

In some examples, the fuel injector 230 described further below may be configured to reduce engine emissions and particulate matter in combination with the piston bowl design providing a compression ratio of 15:1. For example, a nozzle spray angle of the fuel injector 230 may affect an amount of particulate matter emissions. Specifically, if the nozzle spray is too wide, there is potential for the spray to interact with the cylinder head which may lead to higher particulate matter emissions. Similarly, a nozzle spray angle that is too narrow may lead to decreasing mixing and higher particulate matter emissions. Therefore, configuring the nozzle spray angle for reduced emissions may results in a combustion system with reduced emissions. Additionally, a fuel injector nozzle flow rate may be controlled by an overall fuel injector hole size (e.g., aperture size) and may also affect particulate matter emissions. For example, a higher nozzle flow rate may increase efficiency due to combustion occurring more rapidly than if the nozzle flow rate were lower. However, faster combustion may lead to an increase in particulate matter emissions. Therefore, there is a tradeoff between nozzle flow rate for lower fuel consumption while still meeting target emissions levels.

Thus, the compression ratio of 15:1, the piston bowl design, and the fuel injector design described further below may together in combination provide an engine with relative high efficiency and reduced NOx and particulate matter emissions over more standard engines with a higher compression ratio and different injector design. In another example, the combustion system shown in FIG. 2 has a compression ratio of approximately 16:1. FIG. 3 shows further geometry details of the piston bowl 236 that provide a compression ratio in this range.

Additionally, configuring fuel injection parameters of the fuel injector may further reduce emissions while maintaining engine performance. As discussed further below with reference to FIGS. 4-6, a nozzle of the fuel injector 230 may be configured for the given compression ratio in order to reduce particulate matter and NOx emissions to or below threshold levels. In one example, the threshold levels may be based on industry regulated or standard values. Further, the combustion system of FIG. 2 may be used in a vehicle system without an aftertreament system (e.g., the entire exhaust passage does not contain any particulate filters, exhaust catalysts, or the like for treating exhaust gases from the engine). Thus, the nozzle of the fuel injector 230 may be configured for the given compression ratio in order to reduce particulate matter and NOx emissions to or below regulated levels without treating the exhaust gases in the exhaust passage. For example, a geometry of the nozzle, such as a size and number of apertures (e.g., nozzle holes), may affect the levels of particulate matter and NOx emitted by the engine. Specifically, the geometry of the nozzle may affect the nozzle flow rate. In one example, reducing the nozzle flow rate (e.g., flow rate of fuel through the injector nozzle) may reduce particulate matter emissions. Further details on the geometry of the nozzle of the fuel injector 230 are discussed below with reference to FIGS. 4-6.

Configuring the combustion system geometry in this way may reduce particulate matter emissions and NOx emissions. Further, the configured combustion system may eliminate the need for an aftertreatment system. Eliminating the aftertreatment system may reduce the cost of engine while still meeting emissions requirements. Eliminating the aftertreatment system may also reduce fuel consumption of the engine, thereby leading to a lower life cycle cost of the engine. In alternate embodiments, the optimized combustion system may include a smaller aftertreatment system with fewer components than a standard vehicle aftertreatment system.

Turning now to FIG. 3, a schematic 300 of a cross-section of the piston crown 232 is depicted. The schematic 300 also includes the coordinate axis 208 with the vertical axis 210 and the horizontal axis 212. The cross-section of the piston crown 232 is taken in the x-y plane formed by the vertical axis 210 and the horizontal axis 212. The piston crown 232 has an overall cylindrical shape and is centered in the cylinder 202, along the central axis 228 (as shown in FIG. 2). The piston crown 232 has a central axis 302 which is parallel to and coincides with the central axis 228 shown in FIG. 2. As such, the piston crown 232 is symmetric about the central axis 302, as well as the central axis 288.

As shown in FIG. 2, the piston crown 232 includes an outer (e.g., exterior) wall 304 which may contact an interior wall of the cylinder. Additionally, the piston crown 232 includes a top surface 306. The top surface 306 is substantially flat and is formed around an outer circumference of the piston crown 232. A height H of the top surface 306 is measured from a horizontal bore axis 308 of the piston crown 232. In one example, the height H of the top surface may be from 60 to 80 mm. In another example, the height H of the top surface 306 may be greater than 80 mm or less than 60 mm. The height H of the top surface 306 may be based on a size of the piston skirt (or an overall size of the piston) and a size of the cylinder (e.g., height, or length, of the cylinder).

As introduced above with reference to FIG. 2, the piston crown 232 includes a piston bowl 236. The piston bowl 236 may also be referred to herein as the piston crown bowl or the bowl of the piston crown 232. The piston bowl 236 is symmetric around the central axis 302. The piston bowl 236 includes a central apex 310 centered along the central axis 302. The apex 310 has a convex, spherical shape with an apex radius R1. In one example, the apex radius R1 is from 3 mm to 5 mm. For example, the apex radius R1 may be substantially 4 mm. In another example, the apex radius R1 may be greater than 5 mm or less than 3 mm. A height of the apex 310 is substantially the same as the height H of the top surface 306. In alternate embodiments, the height of the apex 310 may be lower than the height H of the top surface 306.

From the apex 310, the piston bowl 236 slopes downward, in the direction of the vertical axis 210, and toward a curved base 312 of the piston bowl 236. The curved base 312 is depressed below the height H of the top surface 306 and the apex 310. Specifically, the piston bowl 236 has a depth D defined from the top surface 306 to the curved base 312. Additionally, the curved base 312 is positioned symmetrically around the apex 310. The curved base 312 has a generally concave shape with a base radius R4. In one example, the base radius R4 is from 16 mm to 20 mm. For example, the base radius R4 may be 18 mm. In another example, the base radius R4 is greater than 20 mm or smaller than 16 mm.

The curved base 312 has a base diameter D3. The base diameter D3 is smaller than the bowl diameter D2 and the piston diameter D1. If the bowl diameter D3 decreases, the curved base 312 moves closer to the apex 310. As such, the slope between the apex 310 and the curved base 312 may become more severe and have a larger angle, the angle defined from a horizontal plane tangent with the apex 310 and perpendicular with the central axis 302. At the same time, moving the curved base 312 closer to the apex 310 causes a slope between the curved base 312 and the top surface 306 to become less severe (e.g., a grade of the slope decreases). In this way, the base diameter D3 may affect a shape of the piston bowl 236.

The piston bowl 236 transitions from the curved base 312 to the top surface 306 of the piston crown 232 through a curved transition (e.g., fillet). The curved transition has a transition radius R3. In one example, the curved transition radius is from 6 mm to 14 mm. In another example, the transition radius R3 may be smaller than 6 mm or greater than 14 mm.

The piston crown 232 also includes a central bore 314. The central bore 314 has a curved, crown shape and is centered along the central axis 302. In another embodiment, the central bore 314 may have a different shape such as an open cylindrical shape. Additionally, as shown in FIG. 3, the piston crown 232 includes void portions 340 with a curved and oblong shape. In alternate embodiments, the void portions 340 may have a different shape or size, such as a more circular or square shape.

The depth D of the piston bowl 236, along with the various radii of the piston crown 232, as discussed above, determine a volume of the piston bowl 236. The piston bowl 236 has a bowl diameter D2 defined between an inside edge of the top surface 306. The bowl diameter D2 further determines the piston bowl volume. Thus, the depth D, radii, and bowl diameter D2 may be chosen to result in a desired piston bowl volume. The desired piston bowl volume may be based on the desired compression ratio (e.g., 15:1) of the cylinder and engine.

Additionally, the piston crown has an overall piston diameter D1 which is also the diameter of the piston. In one example, the piston diameter D1 is from 200 mm to 300 mm. For example, the piston diameter may be 250 mm. In another example, the piston diameter D1 may be smaller than 200 mm or bigger than 300 mm. The piston diameter D1 may be based on the cylinder diameter. For example, the piston diameter D1 may be slightly smaller than the cylinder diameter. Additionally, the piston diameter D1 may be adjusted based on a desired compression ratio of the cylinder.

FIG. 4 shows a schematic 400 of cross-section of a fuel injector 230. Specifically, the schematic 400 shows a nozzle 402 of the fuel injector 230 (e.g., injector nozzle). The schematic 400 also includes the coordinate axis 208 with the vertical axis 210, the horizontal axis 212, and a lateral axis 450. The cross-section of the fuel injector 230 is taken in the x-y plane formed by the vertical axis 210 and the horizontal axis 212. The fuel injector 230 has a central axis 404. As shown in FIG. 2, the central axis 404 is positioned along the central axis 228 of the cylinder 202.

The fuel injector 230 has a cylindrical shape. A diameter 410 of a body 408 of the fuel injector 230 is greater than a nozzle diameter 412 of the nozzle 402. The nozzle 402 has a nozzle length 414. In one example, the nozzle length 414 is from 30 mm to 40 mm. For example, the nozzle length 414 may be 34 mm. In another example, the nozzle length 414 may be greater than 40 mm or less than 30 mm. The nozzle length 414 may be approximately ⅕ the total length of the fuel injector 230. When the fuel injector 230 is positioned in a cylinder, the nozzle 402 extends into a central portion of a combustion chamber of the cylinder. For example, as shown in FIG. 2, a nozzle tip 420 of the nozzle 402 protrudes into the combustion chamber. The nozzle 402 is operable to inject fuel directly into the combustion chamber.

The nozzle 402 includes a nozzle body 415, the nozzle body 415 including a nozzle flow passage 416 and a nozzle needle 418. The nozzle 402 further includes a nozzle tip 420. Fuel for injection travels through the flow passage 406 of the fuel injector 230 and downstream to the nozzle flow passage 416. The nozzle needle 418 controls the flow of fuel through the nozzle flow passage 416 and out of the nozzle tip 420.

The nozzle tip 420 of the nozzle 402 has a convex, dome-shape with a diameter 422. In one example, the diameter 422 is from 5 mm to 7 mm. For example, the diameter 422 of the nozzle tip 420 may be 6 mm. In another example, the diameter 422 may be larger than 7 mm or smaller than 5 mm. Additionally, the nozzle tip 420 has a dome height 438 from 2 mm to 4 mm. For example, the dome height 438 may be approximately 3 mm. In another example, the dome height 438 may be approximately half the diameter 422 of the nozzle tip 420.

Fuel is injected into the combustion chamber from the nozzle tip 420. The dome-shaped nozzle tip 420 of the nozzle 402 defines a number of apertures. Said another way, the nozzle tip 420 includes a number of apertures. The apertures are small passages or channels wherein fuel passes from inside of the nozzle 402 to the combustion chamber. The nozzle tip 420 includes a number of apertures in a range of from six to ten. In one embodiment, as shown in FIG. 4 and FIG. 7 (FIG. 7 described further below), the apertures have a circular cross sectional profile and may be referred to as nozzle holes. Specifically, the nozzle tip 420 includes a cylindrical inner chamber 424 with a plurality of nozzle hole openings. The nozzle tip 420 has a plurality of nozzle holes 426. The nozzle holes 426 are symmetrically positioned around the central axis 404. The nozzle holes 426 include an inner hole opening 428, an outer hole opening 430, and a port 432 (e.g., channel) extending between the inner hole opening 428 and the outer hole opening 430. The outer hole openings 428 of the nozzle holes 426 are positioned along an outer circumference of the nozzle tip 420. As such, each nozzle hole 426 has a length in which fuel travels from the respective inner hole opening 428 to the outer hole opening 430 positioned on an outside of the nozzle tip.

The inner chamber 424 has a diameter 434 smaller than the diameter 422 of the nozzle tip 420. In one example, the diameter 424 is from 1.5 mm to 2.5 mm. For example, the diameter 424 may be 2 mm. In another example, the diameter 424 is greater than 2.5 mm or less than 1.5 mm. In yet another example, the diameter 424 is approximately ⅓ of the diameter 422.

Each of the nozzle holes 426 are angled relative to an opposite nozzle hole across the central axis 404 such that the nozzle tip 420 of the nozzle 402 has a spray angle 436 from 135 degrees to 140 degrees. As such, the fuel injector 230 is configured to provide fuel into a combustion chamber during use with a spray angle from 135 degrees to 140 degrees relative to opposite nozzle holes 426 across the central axis 404 of the fuel injector 230. In one example, the nozzle 402 has a spray angle 436 of approximately 137.5 degrees with a machining tolerance of ±2.5 degrees. As shown in FIG. 4, the spray angle 436 is defined between a first nozzle hole and a second nozzle hole, the first nozzle hole and second nozzle hole being corresponding nozzle holes separated by approximately 180 degrees from one another around an circumference of the nozzle tip 420. This may be better seen in FIG. 6, described further below. The spray angle 436 may be based at least in part on the position and the geometry of the nozzle holes 426.

In another embodiment, a central spray angle may be defined between the central axis 404 and one nozzle hole. In some examples, the central spray angle may be approximately half of the spray angle 436 described above. For example, the nozzle 402 may have a central spray angle of approximately 68.75 degrees with a machining tolerance of ±2.5 degrees. In another example, the central spray angle may be in a range of approximately 67.5 to 70 degrees. The central spray angle may be used to defined a spray angle of a nozzle 402 having an odd number of nozzle holes 426.

FIG. 5 shows an isometric view 500 of the nozzle 402 of the fuel injector 230. The coordinate axis 208 with the vertical axis 210, the horizontal axis 212, and the lateral axis 450 is shown. The plurality of nozzle holes 426 are shown positioned around an outer circumference of the nozzle tip 420. Further, the plurality of nozzle holes 426 are positioned proximate to a base of the dome-shaped nozzle tip 420.

FIG. 6 shows an end view 600 of the nozzle tip 420 of the fuel injector 230. The coordinate axis 208 with the horizontal axis 212 and the lateral axis 450 is shown. The end view 600 is taken in a plane defined by the lateral axis 450 and the horizontal axis 212. The end view 600 shows eight nozzle holes 426 (e.g., apertures) positioned symmetrically around the central axis 404. As introduced at FIG. 4, each nozzle hole 426 includes a respective inner hole opening 428, outer hole opening 430, and port 432. The inner hole openings 428 of the nozzle holes 426 are positioned symmetrically around a circumference of the inner chamber 424. The outer hole openings 430 of the nozzle holes 426 are positioned symmetrically around the outer circumference of the nozzle tip 420.

As shown in FIG. 6, each of the eight nozzle holes 426 are separated from one another by an angle 602. In this case the angle 602 is approximately 45 degrees such that the eight nozzle holes 426 are spaced substantially equal from one another. In one embodiment, as shown in FIG. 6, the nozzle defines only eight nozzle holes 426 (e.g., apertures). In an alternate example, the nozzle tip 420 may include from six to ten nozzle holes 426. For example, in one embodiment, the nozzle tip 420 may include only six nozzle holes 426. In this embodiment, the angle 602 would be approximately 60 degrees.

Figure 8:
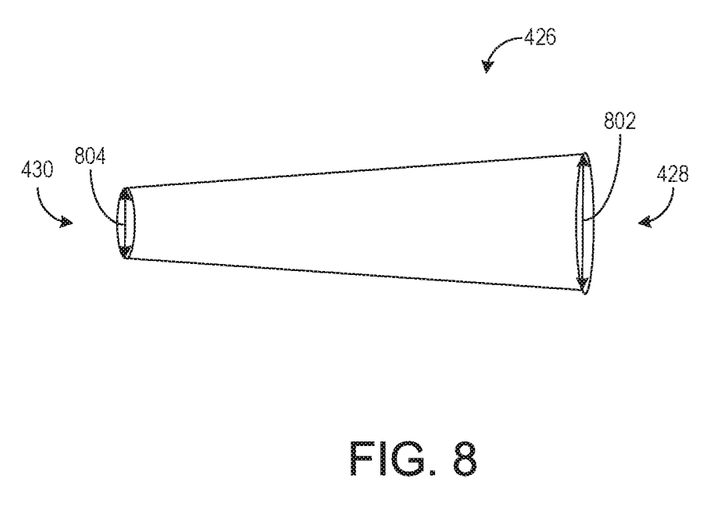
FIG. 8 shows a nozzle hole having an inlet diameter and outlet diameter according to an embodiment of the invention.

Additionally, as shown in FIG. 8, each nozzle hole 426 has an inlet diameter 802 and an outlet diameter 804. Specifically, the inner hole opening 428 of each nozzle hole 426 has an inlet diameter 802 and the outer hole opening 430 of each nozzle hole 426 has an outlet diameter 804. As such, the inner hole opening 428 may be referred to as the inlet of the nozzle hole 426 and the outer hole opening 430 may be referred to as the outlet of the nozzle hole 426. In one example the inlet diameter 802 is from 0.25 to 0.35 mm. The inlet diameter 802 is larger than the outlet diameter 804. A K-factor is defined as a scaled difference between the inner diameter and the outer diameter. Specifically, the K-factor is a difference between the inlet diameter and the outlet diameter, divided by a scaling factor of 10 microns. The nozzle 402 has a K-factor of five. In another example, the nozzle 402 has a K-factor larger or smaller than five. If the K-factor of the nozzle 402 is about five, in one example, the outlet diameter may be in a range of from about 0.2 mm to about 0.3 mm.

Additionally, the inlet diameter is rounded with a hydraulic rounding procedure. Specifically, the nozzle holes 426 have a rounded edge with a hydraulic erosion rounding to increase the flow that is in a range from about 25% to about 30% compared to flow before rounding. Said another way, the hydraulic erosion rounding may increase flow through the nozzle holes 426 compared to flow through the nozzle holes 426 before applying the specific hydraulic rounding percentage. In one example, the hydraulic erosion rounding is in a range from about 28% to about 29%. For example, the hydraulic erosion rounding may be 28.5%.

The geometry of the nozzle 402 and the nozzle holes 426 affect a nozzle flow rate of the nozzle 402. Specifically, the geometry and number of nozzle holes 426 described above provide an injector nozzle flow rate that is in a range of from about 90 cm$^3$/s to about 95 cm$^3$/s at a pressure of about 10,000 kPa. For example, a nozzle 402 with only eight nozzle holes 426 with the geometry ranges described above gives a nozzle flow rate in a range from about 92 cm$^3$/s to about 94 cm$^3$/s at a pressure of about 10,000 kPa. In one example, eight nozzle holes 426 with a K-factor of five and a hydraulic rounding of 28.5% gives an injector nozzle flow rate of about 93.1 cm$^3$/s at a pressure of about 10,000 kPa. In one example, the injector nozzle flow rate of about 93.1 cm$^3$/s may be a target flow rate for reduced emissions with the piston crown design shown at FIG. 3. An engine having a fuel injector with a different number of nozzle holes (e.g., four nozzle holes) with a different geometry (e.g., different K-factor and hydraulic rounding) may provide a different nozzle flow rate resulting in higher emissions than the engine with the target nozzle flow rate. Thus, a nozzle 402 with specifically only eight nozzle holes 426 may at least partially contribute to an engine having reduce emissions in combination with the specific piston crown design and compression ratio described above.

FIG. 7 shows two cross-sectional views of different nozzle designs. The coordinate axis 208 with the horizontal axis 212 and the vertical axis 210 is shown. The cross-sectional views are taken in a plane defined by the vertical axis 210 and the horizontal axis 212. FIG. 7 shows a first schematic 702 of nozzle tip 420 of a nozzle 420, the nozzle tip 420 having apertures 706 (e.g., nozzle holes). The apertures 706 have a circular cross sectional profile (e.g., area).

In alternate embodiments, the apertures of the nozzle may have a different cross sectional profile such that the apertures are differently shaped nozzle holes. For example, the apertures of the nozzle may have a non-circular cross sectional profile. In one example, the non-circular cross sectional profile of the apertures may be one of a slit, a crescent, a star, an oval, a square, a triangle, a rectangle, or the like. FIG. 7 shows a second schematic 704 of a nozzle tip 420 of a nozzle 402, the nozzle tip 420 having apertures 708 with an alternative cross-sectional area. Specifically, the apertures 708 have a square cross-sectional profile. Apertures of a nozzle having a non-circular cross sectional profile may then include an inlet opening, outlet opening, and port (similar to as described above with reference to the nozzle holes) with the non-circular cross sectional profile (e.g., square cross sectional profile). The apertures with the non-circular cross sectional profile may have a similar geometry (e.g., angling, length, or the like) and position in the nozzle as shown above at FIGS. 4-6.

Additionally, in some embodiments, the nozzle may include apertures with different cross sectional profiles. For example, the nozzle may include a plurality of apertures with at least two of the plurality of apertures having different cross sectional profiles relative to each other. For example, one aperture in a nozzle may have a circular cross sectional profile and a second aperture in the nozzle may have crescent cross sectional profile. In another example, half of the apertures in a nozzle may have a circular cross sectional profile and half of the apertures in the nozzle may have a triangular cross sectional profile.

In yet another embodiment, the apertures may be shaped as volutes. For example, the flow of fuel into the nozzle may enter the nozzle at an angle or curve such that a spin or swirl is introduced into the fuel spray. The volute-shaped apertures may then continue to curve and swirl the fuel spray. In yet another example, the apertures of the nozzle may have a venturi or a de laval configuration. For example, one or more apertures of the nozzle may have a cylindrical shape pinched in the middle, thereby forming an hourglass shape. As a result, fuel flowing through the apertures may be accelerated out of the apertures and nozzle. In the above embodiments, the number of apertures may still be in a range of six to ten apertures. For example, the nozzle may include eight apertures with varying cross sectional profiles. The cross sectional profiles may be chosen based on a desired fuel flow rate for target NOx and particulate matter emission levels.

In this way, a combustion system may include a central fuel injector and a piston including a piston crown bowl. A geometry of the piston crown bowl and a nozzle of the fuel injector may affect engine emissions levels. Thus, the components of the combustion system may be sized, as described above, to provide for a reduced compression ratio engine with reduced emission levels. As a result, an aftertreatment system of the engine may be reduced in size or eliminated completely. This may, in turn, reduce the cost and/or servicing requirements of the engine.

As one embodiment, a combustion system comprises a piston crown bowl with a central apex, a combustion chamber operable at a compression ratio in a range of from about 13:1 to about 17:1, the combustion chamber formed at least partially by the piston crown bowl, and a fuel injector with a nozzle extending into a central portion of the combustion chamber that is operable to inject fuel directly into the combustion chamber, the nozzle defining a number of apertures that is in a range of from six to ten.

The piston crown bowl is formed in a piston crown of a piston, the piston crown centered along a central axis of a cylinder in which the piston is positioned. Additionally, the fuel injector and the piston crown bowl are centered along the central axis and the piston crown bowl is symmetric about the central axis. Further, the fuel injector is axially aligned, with respect to the central axis, and positioned in a cylinder head of the cylinder.

The apertures are symmetrically positioned around the central axis and along an outer circumference of a nozzle of the fuel injector. A geometry and number of the apertures provides an injector nozzle flow rate that is in a range of from about 90 cm$^3$/s to about 95 cm$^3$/s at a pressure of about 10,000 kPa. In one example, the nozzle defines only eight apertures. Additionally, the fuel injector is configured to provide fuel into the combustion chamber during use with a spray angle that is in a range of from about 135 degrees to about 140 degrees relative to opposite apertures across a central axis of the fuel injector, the spray angle resulting at least in part based on a position and geometry of the apertures.

Each aperture has an inlet diameter and outlet diameter and a scaled difference between the inlet diameter and the outlet diameter is five. Additionally, each aperture includes a rounded edge with a hydraulic erosion rounding that is in a range of from about 25% to about 30%.

The fuel injector also comprises seals that are configured to not leak fuel that is supplied through a common rail fuel delivery system that is at a pressure of 300,000 kPa or less.

In one example, at least two of the apertures have different cross sectional profiles relative to each other. In another example, at least one of the apertures has a cross sectional profile that is non-circular. In yet another example, the at least one of the apertures that has the non-circular cross sectional profile has a cross sectional profile that is one of a slit, a crescent, an oval, a star, a triangle, or a square.

Further, an engine may comprise a cylinder block at least partially defining a cylinder, a piston at least partially disposed in the cylinder, a cylinder head attached to the cylinder block and at least partially enclosing the cylinder, and the combustion system described above. The piston crown bowl is formed in a piston crown of the piston and the combustion chamber is defined between one more of the cylinder, the cylinder head, or the piston crown.

As another embodiment, a combustion system comprises a cylinder with a central axis, a piston crown including a piston crown bowl with a central apex centered on the central axis, the piston crown bowl forming a combustion chamber with a volume providing a compression ratio of 15:1, and a central fuel injector that is operable to inject fuel directly into the combustion chamber, the central fuel injector including eight nozzle holes and positioned axially along the central axis and in a cylinder head of the cylinder.

The piston crown bowl is symmetric around the central axis. Additionally, a height of the central apex is lower than a height of a top surface of the piston crown and the piston crown bowl includes a curved base, the curved base depressed below the height of the central apex and positioned symmetrically around the central apex. The central apex has a convex, spherical shape with an apex radius that is in a range of from 3 to 5 mm and the curved base has a concave shape with a base radius that is in a range of from 16 to 20 mm.

The nozzle holes are symmetrically positioned around the central axis and along an outer circumference of a dome-shaped nozzle. Each of the nozzle holes has a K-factor of five and a hydraulic erosion rounding that is in a range of from 28% to 29%, the K-factor defined as a difference between an inlet diameter and an outlet diameter of each of the nozzle holes, divided by a scaling factor of 10 microns and the hydraulic erosion rounding defined as a percentage increase in flow of the nozzle from before to after rounding.

The central fuel injector has a nozzle flow rate that is in a range of from 92 to 94 cm$^3$/s at a pressure of about 10,000 kPa, the nozzle flow rate based on the eight nozzle holes and the K-factor and hydraulic erosion rounding of the nozzle holes.

As yet another embodiment, a combustion system comprises a cylinder with a central axis, a piston including a piston crown with a bowl, the bowl including a central apex centered along the central axis, the bowl forming a combustion chamber operable at a compression ratio of 15:1, a central fuel injector for injecting fuel into the combustion chamber, the central fuel injector including eight nozzle holes and axially aligned along the central axis and positioned in a cylinder head of the cylinder, and an exhaust passage without an aftertreatment system. The exhaust passage does not include exhaust catalysts or particulate filters.

Each of the eight nozzle holes has a K-factor of five and a hydraulic erosion rounding of 28.5% providing an injector nozzle flow rate of 93.1 cm$^3$/s at a pressure of about 10,000 kPa, the K-factor defined as a scaled difference between an inner diameter and an outer diameter of each of the eight nozzle holes. Additionally, a nozzle of the central fuel injector has a spray angle in a range of from 135 to 140 degrees.

The system further comprises a controller configured to activate the central fuel injector to inject fuel into the combustion chamber to operate an engine in which the combustion system is installed to carry out combustion at the compression ratio of 15:1.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A combustion system, comprising:
   a cylinder with a central axis;
   a piston crown including a piston crown bowl with a central apex centered on the central axis and a curved base, where the piston crown bowl transitions from the curved base to a top surface of the piston crown through a curved transition having a transition radius, the piston crown bowl, sides of the cylinder, and a top of the cylinder forming a combustion chamber with a volume providing a compression ratio of 15:1; and
   a central fuel injector that is operable to inject fuel directly into the combustion chamber, the central fuel injector including eight nozzle holes and positioned axially along the central axis and in a cylinder head of the cylinder, where outlets of the eight nozzle holes are symmetrically positioned around the central axis and along an outer circumference of a nozzle of the central fuel injector, each of the outlets having a common radius from the central axis, wherein the nozzle holes are symmetrically positioned around the central axis and along the outer circumference of the nozzle which is dome-shaped, wherein each of the nozzle holes has a K-factor of five, the K-factor defined as a difference between an inlet diameter and an outlet diameter of each of the nozzle holes, divided by a scaling factor of 10 microns, and wherein a tip of the nozzle has a height that is approximately half a diameter of the tip.

2. The combustion system of claim 1, wherein the piston crown bowl is symmetric around the central axis, wherein a height of the central apex is the same as a height of the top surface of the piston crown, wherein the curved base is depressed below the height of the central apex and positioned symmetrically around the central apex, and wherein the central apex has a convex, spherical shape with an apex radius that is in a range of from 3 to 5 mm and the curved base has a concave shape with a base radius that is in a range of from 16 to 20 mm.

3. The combustion system of claim 1, wherein the central fuel injector has a nozzle flow rate that is in a range of from 92 to 94 cm$^3$/s at a pressure of about 10,000 kPa, the nozzle flow rate based on the eight nozzle holes and the K-factor of the nozzle holes and wherein the piston crown includes a central bore centered along the central axis and positioned below the central apex and void portions positioned around the central bore and below the piston crown bowl.

4. A combustion system, comprising:
   a cylinder with a central axis;
   a piston including a piston crown with a bowl, the bowl including a central apex centered along the central axis and a curved base, where the bowl transitions from the curved base to a top surface of the piston crown through a curved transition having a transition radius, the bowl forming a volume of a combustion chamber having a compression ratio of 15:1;
   a central fuel injector for injecting fuel into the combustion chamber, the central fuel injector including eight nozzle holes and axially aligned along the central axis and positioned in a cylinder head of the cylinder, where each of the eight nozzle holes includes an outlet, and where outlets of the nozzle holes are symmetrically positioned around the central axis and along an outer circumference of a nozzle of the central fuel injector, each of the outlets positioned at a common radius on the outer circumference from the central axis; and
   an exhaust passage without an aftertreatment system, wherein the exhaust passage does not include exhaust catalysts or particulate filters, wherein each of the eight nozzle holes has a K-factor of five providing an injector nozzle flow rate of 93.1 cm$^3$/s at a pressure of about 10,000 kPa, the K-factor defined as a difference between an inner diameter and an outer diameter of each of the eight nozzle holes, divided by a scaling factor of 10 microns, and wherein the nozzle of the central fuel injector has a spray angle in a range of from 135 to 140 degrees defined by a position of opposite nozzle holes of the eight nozzle holes across the central axis.

5. The system of claim 4, further comprising a controller including a microprocessor with instructions stored in memory to activate the central fuel injector to inject fuel into the combustion chamber to operate an engine in which the combustion system is installed to carry out combustion at the compression ratio of 15:1 and wherein a height of the central apex is substantially the same as a height of the top surface of the piston crown.

\* \* \* \* \*